SYSTEM FOR PHASE LOCKING ON A VIRTUAL CARRIER RECEIVED BY AN ASYMMETRICAL RECEIVER

Filed Sept. 17, 1970 5 Sheets-Sheet 1

INVENTORS
DAVID M. MOTLEY
NAIF D. SALMAN
BY Edward Dugas
ATTORNEY

INVENTORS
DAVID M. MOTLEY
NAIF D. SALMAN
BY Edward Dugas
ATTORNEY

INVENTORS
DAVID M. MOTLEY
NAIF D. SALMAN
BY Edward Dugas
ATTORNEY

INVENTORS
DAVID M. MOTLEY
NAIF D. SALMAN
BY Edward Dugas
ATTORNEY

INVENTORS
DAVID M. MOTLEY
NAIF D. SALMAN
BY Edward Dugas
ATTORNEY 3,669,511

SYSTEM FOR PHASE LOCKING ON A VIRTUAL CARRIER RECEIVED BY AN ASYMMETRICAL RECEIVER

David M. Motley, Santa Ana, and Naif D. Salman, Orange, Calif., assignors to North American Rockwell Corporation Filed Sept. 17, 1970, Ser. No. 72,949
Int. Cl. H04b 1/30
U.S. Cl. 325—329 4 Claims

ABSTRACT OF THE DISCLOSURE

The present invention is directed to a phase-lock system which can derive a demodulating carrier reference signal for use in a suppressed carrier quadrature, amplitude modulating digital data transmission system which does not require the transmission of a low level carrier or pilot tones.

The system operates by multiplying the equalized received cross coupled signal in each channel by a specified function of the decoded $n$-level data signal of both channels and subtracting the products and dividing the results by the error signal coefficient to arrive at an error signal which is proportional to the phase error between the demodulating carrier reference signal and the suppressed transmitting carrier. The derived error signal can be made independent of data signal level values and the received signal levels even in the presence of severe intersymbol interference and cross coupled terms. The derived phase error signal is then fed back to a variable oscillator providing the demodulating carrier reference signal to change the phase of the reference signal so as to reduce the error signal towards zero.

BACKGROUND OF THE INVENTION

The present invention relates generally to phase lock systems and, more particularly, to a system for deriving a phase error signal from an amplitude modulated, suppressed carrier signal without requiring the transmission of a low level carrier signal or pilot tones.

Phase lock systems or phase lock loops have been used in the past in many applications to recover or track the phase of the transmitting carrier of a received signal. Heretofore, such systems have required the transmission of some signal, in addition to the information signals, to indicate the phase of the transmitting carrier. For example, many amplitude modulation, suppressed carrier systems employ a phase locked loop in which the received signal includes a relatively low level carrier signal, or pilot tones, in addition to the information carrying sidebands. The sidebands are applied to a demodulation multiplier or phase detector (demodulator) which receives, as a second input, the output of a variable voltage controlled oscillator. The low level carrier signal, or pilot tones, are detected and compared with the oscillator output to develop an error signal proportional to the phase difference between the carrier and the oscillator output. This phase error signal is then generally low pass filtered which tends to eliminate all components other than the DC component indicative of the phase error. The filtered phase error signal is then DC amplified and applied to the oscillator to control its frequency so as to minimize the phase error. The low level carrier or pilot tones naturally decrease the signal energy available for the information signals and there has long been a need for a system for deriving a phase error signal for a phase lock system which did not consume transmitted energy.

A number of systems exist in the prior art for transmitting digital data over telephone lines and for correcting the distortion in the received signal due to varying transmission line distortion. One such system is disclosed in U.S. Pat. No. 3,614,623, entitled "Adaptive System for Correction of Distortion of Signals in Transmission of Digital Data," filed Apr. 21, 1969 by G. K. McAuliffe. The data transmission system disclosed therein transmits a four vector signal generated by combining two amplitude modulated data signal waves in quadrature. The two modulators used are of the switching type, each providing a double-sideband spectrum. The carrier for the two data signal trains is displaced by 90° and is added before transmission to provide a four phase data signal for transmission. To insure maximum utilization of the transmission channel, two orthogonal subchannels with multilevel amplitude modulation are used on each channel. With this arrangement, more than one bit of information may be transmitted in each Nyquist interval. (A Nyquist interval is that time period in which successive impulses may be transmitted by a channel without interference between the peaks of the received pulses; the corresponding Nyquist rate is a rate in signal values-per-second, numerically equal to approximately twice the available channel bandwidth in cycles per second.) The receiver for the transmitted data signals includes individual detectors or demodulators for the quadrature carrier signal. The phases of the received in-phase and quadrature data signals are compared with the phase of a local oscillator including a 90° phase shifted output of the oscillator. The oscillator phase must track the phase of the transmitting carrier in order to eliminate the errors in the demodulated signals. One prior method of deriving the carrier frequency of the receiver for demodulation of the data signals is to transmit two pilot tones; e.g., 600 Hz. and 3000 Hz. which are separated by 1200 Hz. or by the reciprocal at the symbol rate from the carrier of 1800 Hz. Phase lock circuits of the receiver recover the two pilot tones from the received signals to enable reconstruction or derivation of the carrier frequency and data bit timing signals.

The present system is an improvement on U.S. patent application, Ser. No. 72,962, filed Sept. 17, 1970, entitled "A System for Phase Locking on a Virtual Carrier," by G. K. McAuliffe. In the basic application, the phase angle error is driven towards zero to achieve phase lock. In the present invention, the error term, comprising of in-phase and quadrature components of the phase angle, is driven to zero.

SUMMARY OF THE INVENTION

The phase lock system of the present invention provides a substantial improvement in deriving a virtual carrier for demodulating received amplitude modulated suppressed carrier signals by controlling the frequency and phase of a local oscillator with an error signal derived from received data signals without the use of a low level carrier signal or pilot tones. The energy normally consumed by these additional signals may then be advantageously utilized in increasing the level of the transmitted information signals.

The error signal is generally derived in the system of this invention by multiplying the equalized received signals including cross coupling terms for each channel by the data signal level of the other channel, subtracting the product and then dividing the result by the sum of the squares of the data signal levels. The error signal is then independent of the data signal level values and of the received signals in the channels.

In a presently preferred embodiment of the invention incorporated in an amplitude modulation, double-sideband, suppressed carrier, quadrature transmission system, the in-phase and quadrature channels of the receiver are substantially identical and are each comprised of a demodulator means for receiving the transmitted digital data signal and for providing a demodulated data signal in accordance with a reference carrier signal. The output from the demodulator is fed to a low pass filter to eliminate high frequency components from the demodulated signal. A sample and hold circuit operating at the transmitted symbol rate samples the demodulated signal from the low pass filter and holds the sampled signal until the next sample time. The sample and hold circuit passes its signal output to a summing amplifier where the equalization process takes place. The summing amplifier then forwards the corrected or equalized signal to an analog to digital converter for transformation into an output data signal. A novel switching and weighting means receives the detected data signals and the equalized received signals which may include cross coupled components to provide an error signal which is fed to a variable oscillator providing the carrier reference signal to the receiver demodulators to change the phase of the carrier reference so as to minimize the magnitude of the error signal.

Accordingly, it is a primary object of the present invention to provide a new and novel phase-lock system which does not require a low level carrier signal or pilot tones.

It is another object of the present invention to provide a novel phase-lock system which operates upon the received data signal to derive an error signal for controlling a reference signal oscillator even if the channel contains asymmetrical amplitude and phase characteristics.

These and other objects of the present invention will become more apparent and better understood when taken in conjunction with the following description and the accompanying drawings, throughout which like characters indicate like parts and which drawings form a part of this application.

DESCRIPTION OF THE PREFERRED EMBODIMENT

Figure 1:
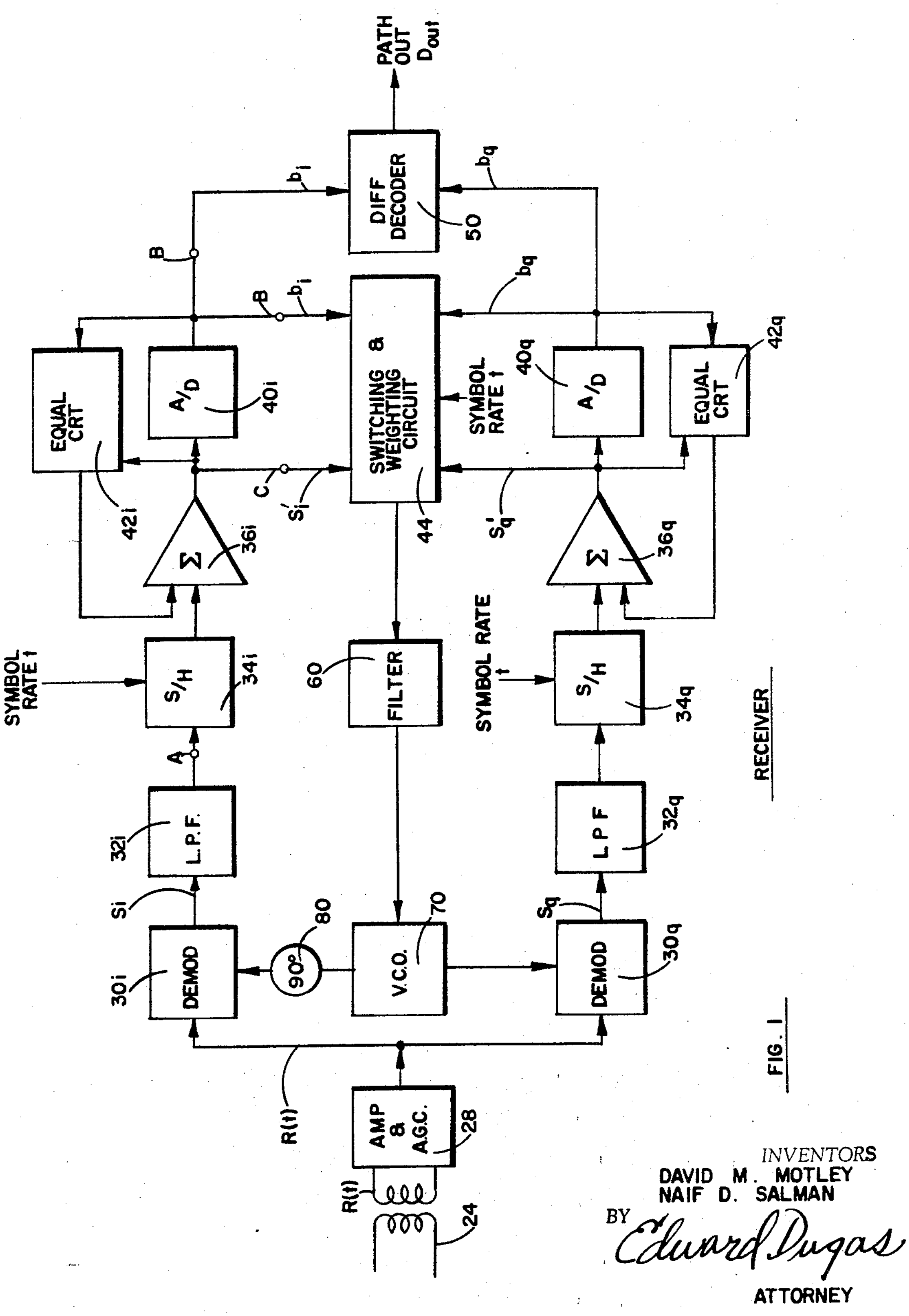
FIG. 1 is a schematic diagram of a receiver for receiving digital data modulated carrier transmissions, including the preferred embodiment of the phase lock circuit of the present invention.

Referring to FIG. 1, a digital data receiver is shown comprised of an in-phase channel I and a quadrature channel Q.

Each of the channels, I and Q, are identical in construction with similar components having similar number designations. The receiver of FIG. 1 is particularly adapted to be used in conjunction with the transmitter disclosed in U.S. patent application Ser. No. 72,962, filed Sept. 17, 1970, entitled "A System for Phase Locking on a Virtual Carrier," by G. K. McAuliffe. The receiving end of the transmission line 24 provides an input signal $R(t)$ to the amplifier and AGC circuit 28.

The input signal $R(t)$ is expressed in the following form:

$$R(t)=X_i \cos \omega_c t+X_q \sin \omega_c t \qquad \text{Eq. 1}$$

where $X_i$ is the general in-phase channel impulse response, $X_q$ is the general quadrature channel impulse response, and $\cos \omega_c t$ and $\sin \omega_c t$ are the in-phase and quadrature carriers, $X_i$ and $X_q$ can be more explicitly defined as:

$$X_i=d(n)_i h_{0i}+d(n)_{i-1}h_{1i}+\ldots +d(n)_q h_{0qi}+d(n)_{q-1}h_{1qi}+\ldots \qquad \text{Eq. 2}$$

$$X_q=d(n)_q h_{0q}+d(n)_{q-1}h_{1q}+\ldots +d(n)_i h_{0iq}+d(n)_{i-1}h_{1iq}+\ldots \qquad \text{Eq. 3}$$

where $d(n)_i$ and $d(n)_q$ represent the signal level for the presently received data bits for an $n$-level modulation system;

$d(n)_{i-1}$, etc. and $d(n)_{q-1}$, etc. represent the signal level for the previously received data bits for the $n$-level modulation system; and $h_{0i}$, $h_{1i}$ etc. and $h_{0q}$, $h_{1q}$ etc. are the sample values of the in-phase and quadrature channel pulse response, respectively, and $h_{0qi}$, $h_{1qi}$, etc. and $h_{0iq}$, $h_{1iq}$, etc. are sample values of the in-phase to quadrature and quadrature to in-phase channel responses, respectively. An in-phase to quadrature and a quadrature to in-phase channel pulse response are present on all channels having asymmetrical amplitudes or phase or both asymmetrical amplitude and phase characteristics.

The input signal $R(t)$ is fed to demodulators 30$_i$ and 30$_q$. Demodulators 30$_i$ and 30$_q$ may, for example, be of the phase sensitive type so as to produce outputs $S_i$ and $S_q$ which are proportional to that component of the input signal which is in-phase with the reference signal applied to each demodulator from the voltage controlled oscillator 70. Between the in-phase channel demodulator 30$_i$ and the oscillator 70 there is interposed a 90° phase shifter 80 which shifts the phase of the reference signal sent to the in-phase channel demodulator 90° with respect to the reference signal sent to the quadrature channel demodulator. The output signals from demodulator 30$_i$ and 30$_q$ will then be $$S_i=R(t) \cos (\omega_c t+\phi); \qquad \text{Eq. 4}$$

$$S_q=R(t) \sin (\omega_c t+\phi); \text{ respectively} \qquad \text{Eq. 5}$$

where $\phi$ is the phase error caused by demodulation with a reference carrier having a different phase from the phase of the modulated carrier of the transmitted signal.

Figure 2:
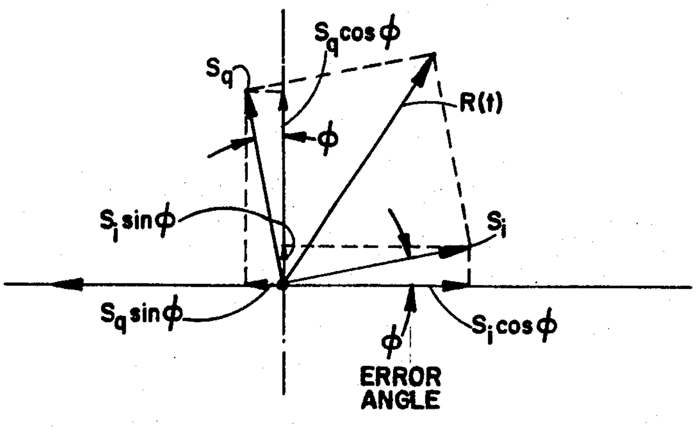
FIG. 2 is a vector diagram illustrating the relationship of the modulated received signal to the phase error of the quadrature demodulated signals.

FIG. 2 illustrates the vector relationships between the input signal $R(t)$, the major cosine, sine, and components of $R(t)$, namely, $S_i$ and $S_q$, and the effect the phase error $\phi$ has upon these signals.

The $S_i$ and $S_q$ signals are then fed to the low pass filters 32$_i$ and 32$_q$ to remove all frequency components greater than $2\omega_c$. From the low pass filter, the signals from 32$_i$ and 32$_q$ are fed to a sample and hold means 34$_i$ and 34$_q$, respectively. The sample and hold means maintain the signals $S_i$ and $S_q$ available at their respective outputs until the next symbol sample time. A data bit timing signal, $t$, having a rate equal to the symbol rate of the transmitted signal is fed to each of the sample and hold means, 34$_i$ and 34$_q$, to indicate the start of the next symbol sample time.

The outputs from the sample and hold means 34$_i$ and 34$_q$ are fed to summing amplifiers 36$_i$ and 36$_q$, respectively. The outputs from amplifiers 36$_i$ and 36$_q$, designated $S_i'$ and $S_q'$, are fed to the analog to digital converters 40$_i$ and 40$_q$, respectively, and to the switching and weighting means 44. The converters change the $S_i'$ and $S_q'$ signals into the corresponding output bit signals $b_i$ and $b_q$. The signals $b_i$ and $b_q$ correspond to the data bits in the I and Q channels, respectively. The switching and weighting means 44 receives as inputs the $S_i'$, $S_q'$, $b_i$, $b_q$ and symbol rate $t$ timing signals. Equalizer circuits $\mathbf{42}_i$ and $\mathbf{42}_q$ receive the $S_i'$, $S_q'$, $b_i$ and $b_q$ signals from their respective circuits and produce the required equalization signals. The output of the equalizers is fed back to their respective summation amplifiers $\mathbf{36}_i$ and $\mathbf{36}_q$ to then be subtracted from the signals from the sample and hold circuits 34. Mathematically, the output signals $S_i$ and $S_q$ from the demodulators $\mathbf{30}_i$ and $\mathbf{30}_q$ can be written as follows by substituting Equation 1 into Equations 4 and 5, performing the multiplications; and disregarding the $2\omega_c$ terms:

$$(S_i = X_i \cos\phi - X_q \sin\phi) \qquad \text{Eq. 6}$$

$$(S_q = X_q \cos\phi + X_i \sin\phi) \qquad \text{Eq. 7}$$

Substituting Equations 2 and 3 into Equations 6 and 7 gives the following results:

$$S_i = \begin{Bmatrix} d(n)_i h_{0i} + d(n)_{i-1} h_{1i} \cdots \\ + d(n)_q h_{0qi} + d(n)_{q-1} h_{1qi} + \cdots \end{Bmatrix} \cos\phi - \begin{Bmatrix} d(n)_q h_{0q} + d(n)_{q-1} h_{1g} + \cdots \\ + d(n)_i h_{0iq} + d(n)_{i-1} h_{1iq} + \cdots \end{Bmatrix} \sin\phi \qquad \text{(Eq. 8)}$$

$$S_q = \begin{pmatrix} d(n)_q h_{0q} + d(n)_{q-1} h_{1q} + \cdots \\ + d(n)_i h_{0iq} + d(n)_{i-1} h_{1iq} + \cdots \end{pmatrix} \cos\phi + \begin{pmatrix} d(n)_i h_{0i} + d(n)_{i-1} h_{1i} + \cdots \\ + d(n)_q h_{0qi} + d(n)_{q-1} h_{1qi} + \cdots \end{pmatrix} \sin\phi \qquad \text{Eq. 9}$$

Equations 8 and 9 can, for this application, be considered simplified by assuming that the equalizer technique described in U.S. patent application No. 817,887, entitled "Adaptive System for Correction of Distortion of Signals in Transmission of Digital Data," filed Apr. 21, 1969, by Gerald K. McAuliffe, which invention is assigned to North American Rockwell the assignee of the present invention, will eventually force all $h_{ji}$, $h_{jq}$, $h_{jiq}$ and $h_{jqi}$ terms for $j=1, 2, 3, 4$, etc. to zero. The equalizer systems disclosed in U.S. Pat. No. 3,614,623 can be inserted into the present systems by connecting point A of the present system to the junction of blocks 54 and 57 shown in FIG. 1 of the referenced application, and the junction between blocks 57 and 73 of the reference to point C of the present application and the input to block 51 to the point A of the present application along with the deletion of blocks 34, 36, 40 and 42 of the present application shown in FIG. 1. It can also be shown that in fact $$h_{ji} = h_{jq} \qquad \text{Eq. 10}$$

and $$h_{jiq} = h_{jqi} \qquad \text{Eq. 11}$$

With these assumptions which are indicated by primes, Equations 8 and 9 become $$S_i' = d(n)_i (h_0 \cos\phi - h_{0iq} \sin\phi) + d(n)_q (-h_{0iq} \cos\phi - h_0 \sin\phi) \qquad \text{Eq. 12}$$

$$S_q' = d(n)_q (h_0 \cos\phi - h_{0iq} \sin\phi) + d(n)_i (h_{0iq} \cos\phi + h_0 \sin\phi) \qquad \text{Eq. 13}$$

When Equation 12 is multiplied by $d(n)_q$ and Equation 13 is multiplied by $d(n)_i$, we obtain:

$$d(n)_q S_i' = d(n)_i d(n)_q (h_0 \cos\phi - h_{0iq} \sin\phi) + d(n)_q^2 (-h_{0iq} \cos\phi + h_0 \sin\phi) \qquad \text{Eq. 14}$$

$$d(n)_i S_q' = d(n)_i d(n)_q (h_0 \cos\phi - h_{0iq} \sin\phi) + d(n)_i^2 (h_{0iq} \cos\phi + h_0 \sin\phi) \qquad \text{Eq. 15}$$

Subtracting Equation 15 from Equation 14:

$$d(n)_q S_i' - d(n)_i S_q' = -(d(n)_i^2 + d(n)_q^2)(h_{0iq} \cos\phi + h_0 \sin\phi) \qquad \text{Eq. 16}$$

and further dividing by $(d(n)_i^2 + d(n)_q^2)$, we obtain:

$$\frac{d(n)_q S_i' - d(n)_i S_q'}{d(n)_i^2 + d(n)_q^2} = -(h_{0iq} \cos\phi + h_0 \sin\phi) \qquad \text{Eq. 17}$$

Equation 17 describes the output error signal from the switching and weighting means 44 which is fed to a filter 60 and from there to the voltage controlled oscillator 70 to drive the the oscillator in a direction which causes the total error term (the term defining the system's phase error) to go towards zero. It should be noted that when the term represented in Equation 17 is caused to go to zero, the equations which represent the data signals in both the I and Q channels, Equations 12 and 13, respectively, became exactly independent.

Three examples of the implementation of the system of the present invention will now be given, one example for two-level modulation in each channel and two examples for four-level modulation in each channel. In the two-level case, $d(n)_i$ and $d(n)_q$ each have level values of either $\pm 1$. Simplifying $d(n)_i$ and $d(n)_q$ to $d_i$ and $d_q$, it can be seen that Equation 17 reduces to:

$$d_q S_i' - d_i S_q' = -2(h_{0iq} \cos\phi + h_0 \sin\phi) \qquad \text{Eq. 17a}$$

Figure 3:
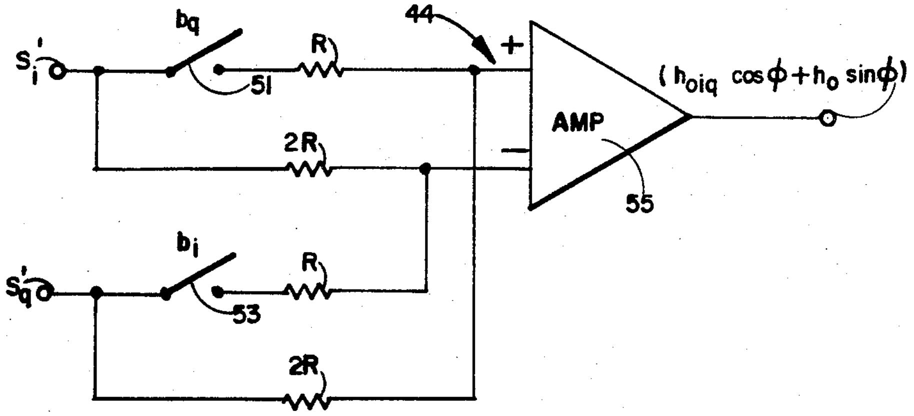
FIG. 3 is a schematic diagram of one embodiment of a switching and weighting means used in the receiver embodiment shown in FIG. 1.

For the two-level case which has been discussed to this point, the switching and weighting means 44 can be mechanized by the circuit of FIG. 3. The signal $S_i'$ is connected to the + and − terminals of amplifier 44 by by means of switch 51 through resistor 2R and resistor R, respectively. The resistors are inserted in the serial path to adjust the amplification factor of amplifier 55. The signal $S_q'$ is connected to the + and − terminals of amplifier 55 by means of switch 53 through resistor 2R and resistor R, respectively. The switches 51 and 53 are field effect transistors controlled by digital signals $b$ applied to the respective gate electrodes. The $b$ symbol is used in the logic sense that when $b$ is true the transistor is conducting, and when $b$ is false the transistor is non-conducting. Also, $b$ is true when data bit $d=+1$ and $b$ is false when $d=-1$. By definition:

$$d_i = 2b_i - 1$$

$$d_q = 2b_q - 1$$

which mechanization is accomplished by the switching and weighting resistor configuration of FIG. 3. Switches 51 and 53 are controlled by the bit signals $b_i$ and $b_q$. The timing signals are properly developed so that the switches are allowed to close only after the sample and hold circuits have been switched to the "HOLD" condition; and so that the switches are again caused to open prior to the time the sample and hold circuits are switched to the "SAMPLE" condition so as to sample the next symbol. Only two switches are needed with this implementation due to the unique coding of the $d$ and $b$ signals defined above.

If only one channel (for example, the I channel) is used to transmit data, the implementation is the same except that the Q channel analog to digital converter $\mathbf{40}_q$ and $d_q$ is set to zero. Equation 15 then reduces to $$-d_i S_q' = (h_{0iq} \cos\phi + h_0 \sin\phi)$$

The error signal is thereby reduced to one-half the magnitude of the previous case but this change can be easily compensated for by increasing the sensitivity of the voltage controlled oscillator 70.

Figure 4:
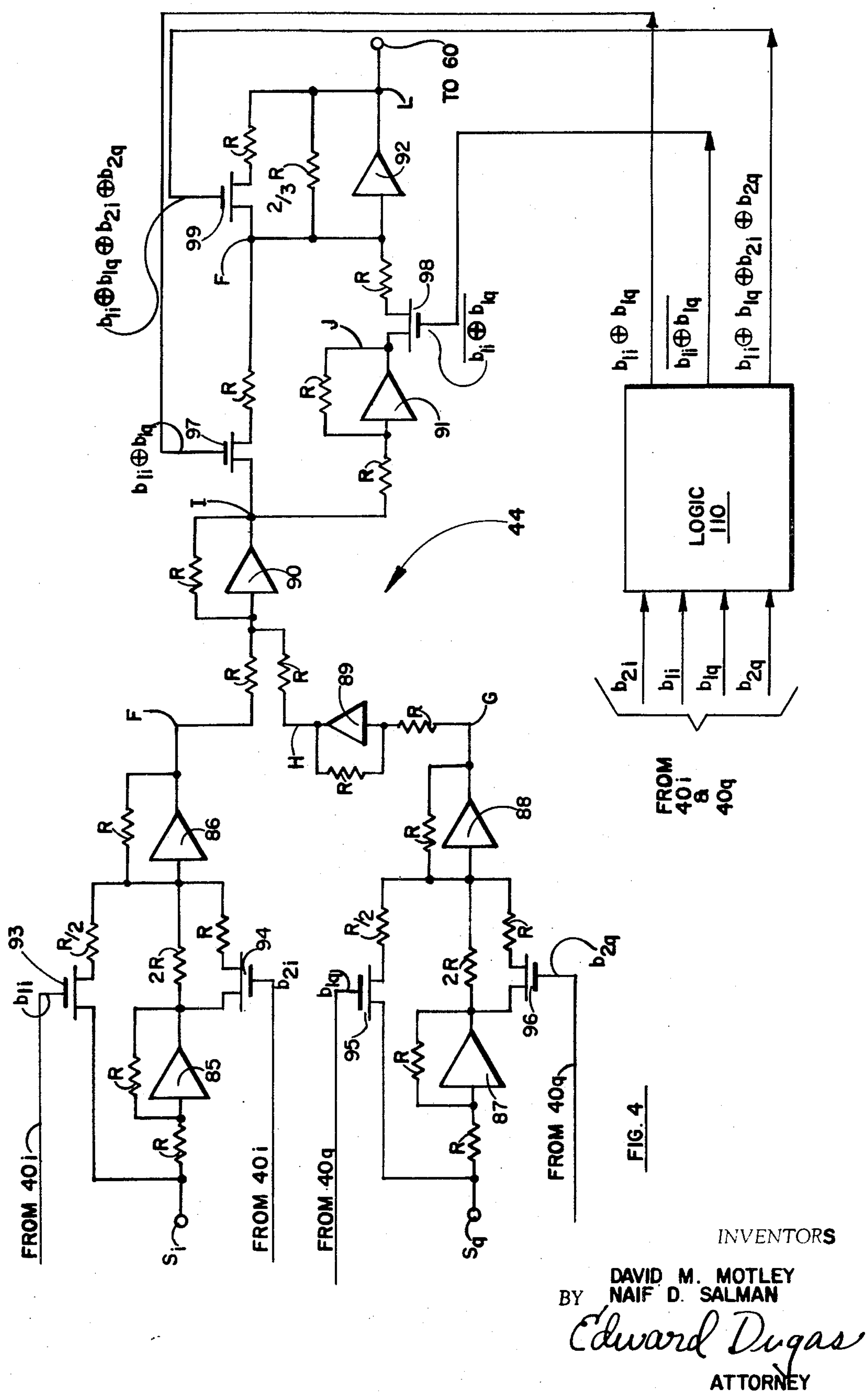
FIG. 4 is a schematic diagram of a second embodiment of a switching and weighting means which can be used with the receiver embodiment of FIG. 1.

Refer now to FIG. 4 wherein an embodiment utilizing four-level modulation is shown. With four-level modulation, two data bits are derived from each sample, $S_i'$ and $S_q'$:

$d_{1i}$ = the most significant bit for the I channel and
$d_{2i}$ = the least significant bit for the I channel and, similarly
$d_{1q}$ and $d_{2q}$ for the Q channel.

Again, it will be assumed that all the previous intersymbol interference has been corrected by the referenced automatic equalization technique.

The analog to digital converters $40_i$ and $40_q$ derive these data bits according to the following table:

| $d_{1i}$ | $d_{2i}$ | $x_i$ [1] |
|---|---|---|
| +1 | +1 | +3/2 |
| +1 | −1 | +1/2 |
| −1 | +1 | −1/2 |
| −1 | −1 | −3/2 |

[1] Signal amplitude units.

and similarly for the Q channel. In this case:

$$S_i'=(d_{1i}+\tfrac{1}{2}d_{2i})(h_{0i}\cos\phi-h_{01q}\sin\phi)+(d_{1q}+\tfrac{1}{2}d_{2q})(h_{0qi}\cos\phi-h_{0q}\sin\phi) \quad \text{Eq. 18}$$

$$S_q'=(d_{1q}+\tfrac{1}{2}d_{2q})(h_{0q}\cos\phi+h_{0qi}\sin\phi)+(d_{1i}+\tfrac{1}{2}d_{2i})(h_{01q}\cos\phi+h_{0i}\sin\phi) \quad \text{Eq. 19}$$

Again, making the following substitutions:

$$h_{0i}=h_{0q}$$
$$-h_{01q}=h_{0qi}$$

$$S_i'=(d_{1i}+\tfrac{1}{2}d_{2i})(h_0\cos\phi-h_{01q}\sin\phi)+(d_{1q}+\tfrac{1}{2}d_{2q})(-h_{01q}\cos\phi-h_0\sin\phi) \quad \text{Eq. 20}$$

$$S_q'=(d_{1q}+\tfrac{1}{2}d_{2q})(h_0\cos\phi-h_{01q}\sin\phi)+(d_{1i}+\tfrac{1}{2}d_{2i})(h_{01q}\cos\phi+h_0\sin\phi) \quad \text{Eq. 21}$$

As in the binary case, it is now necessary to multiply and otherwise manipulate these expressions in the weighting and switching block 44 so that the cross channel data bit terms drop out. However, this is not so directly accomplished as in the binary case because the cross product terms resulting from multiplying the binominal coefficients do not disappear immediately.

There results four different possible mechanizations. Multiply $S_i'$ and $S_q'$ as follows:

| | |
|---|---|
| $(d_{1i}+\frac{1}{2}d_{2q})S_i'$ | $(d_{1q}+\frac{1}{2}d_{2q})S_i'$; |
| $(d_{1i}-\frac{1}{2}d_{2i})S_q'$ | $(d_{1q}-\frac{1}{2}d_{2q})S_i'$ |
| $(d_{1q}+\frac{1}{2}d_{2q})S_q'$ | $(d_{1i}+\frac{1}{2}d_{2i})S_i'$ |
| $(d_{1q}-\frac{1}{2}d_{2q})S_q'$ | $(d_{1i}-\frac{1}{2}d_{2i})S_i'$ |

Although satisfactory mechanizations may be worked out for any of the above alternatives, the last alternative has been found to be most convenient. Then:

$$(d_{1i}-\tfrac{1}{2}d_{2i})S_i'=\tfrac{3}{4}(h_0\cos\phi-h_{01q}\sin\phi)-(d_{1i}d_{1q}+\tfrac{1}{2}d_{1i}d_{2q}-\tfrac{1}{2}d_{1q}d_{2i}-\tfrac{1}{4}d_{2i}d_{2q})(h_{01q}\cos\phi+h_0\sin\ ) \quad \text{Sq. 22}$$

$$(d_{1q}-\tfrac{1}{2}d_{2q})S_q'=\tfrac{3}{4}(h_0\cos\phi-h_{01q}\sin\phi)+d({}_{1i}d_{1q}-\tfrac{1}{2}d_{1i}d_{2q}+\tfrac{1}{2}d_{1q}d2_i-\tfrac{1}{4}d_{2i}d_{2q})\,h_{01q}\cos\phi+h_0\sin\phi) \quad \text{Eq. 23}$$

Subtracting 23 from 22:

$$(d_{1i}-\tfrac{1}{2}d_{2i})S_i'-(d_{1q}-\tfrac{1}{2}d_{2q})S_q'=-(2d_{1i}d_{2q}-\tfrac{1}{2}d_{2i}d_{2q})(h_{01q}\cos\phi+h_0\sin\phi) \quad \text{Eq. 24}$$

Then the desired error signal is found by dividing Equation 24 by $(2d_{1i}d_{1q}-\frac{1}{2}d_{2i}d_{2q})$. Since the $d$'s are data bits having values of either +1 or −1, the divisor can take on only the following values:

| $d_{1i}$ | $d_{1q}$ | $d_{2i}$ | $d_{2q}$ | Divisor, D |
|---|---|---|---|---|
| +1 | +1 | +1 | +1 | +3/2 |
| +1 | +1 | +1 | −1 | +5/2 |
| +1 | +1 | −1 | +1 | +5/2 |
| +1 | +1 | −1 | −1 | +3/2 |
| +1 | −1 | +1 | +1 | −5/2 |
| +1 | −1 | +1 | −1 | −3/2 |
| +1 | −1 | −1 | +1 | −3/2 |
| +1 | −1 | −1 | −1 | −5/2 |
| −1 | +1 | +1 | +1 | −5/2 |
| −1 | +1 | +1 | −1 | −3/2 |
| −1 | +1 | −1 | +1 | −3/2 |
| −1 | +1 | −1 | −1 | −5/2 |
| −1 | −1 | +1 | +1 | +3/2 |
| −1 | −1 | +1 | −1 | +5/2 |
| −1 | −1 | −1 | +1 | +5/2 |
| −1 | −1 | −1 | −1 | +3/2 |

The above table is satisfied by the following statements:

$$D=\pm 3/2 \text{ when } d_{1i}\cdot d_{1q}\cdot d_{2i}\cdot d_{2q}=+1$$
$$D=\pm 5/2 \text{ when } d_{1i}\cdot d_{1q}\cdot d_{2i}\cdot d_{2q}=-1 \quad \text{Eq. 25}$$

Equation 24 is mechanized by the circuit of FIG. 4. Amplifiers 85 to 92 are operational amplifiers which, by definition, have an infinite input impedance with an infinite open-loop gain. Switches 93 to 99 are field-effect transistors controlled by digital signals, $b$, applied to respective gate electrodes. Logic block 110 receives the signals from the A/D converters $40_i$ and $40_q$ and perform the indicated operations to produce the signals shown. The $b$ symbols are used in the logic sense that when $b$ is true the transistor is conducting, and when $b$ is false the transistor is non-conducting. Also, $b$ is true when the date bit $d=+1$ and $b$ is false when $d=-1$. In the following equations, $b=1$ when $b$ is true and $b=0$ when $b$ is false. The signal at point F is presented mathematically as follows:

$$\text{Signal at point } F=S_i'\left[-\frac{R}{R}\left(-\frac{R}{2R}-\frac{R}{R}b_{2i}\right)-\frac{2R}{R}b_{1i}\right]=S_i'(\tfrac{1}{2}+b_{2i}-2b_{1i}) \quad \text{Eq. (27)}$$

This output is equivalent to performing the negative value of the multiplication given by the left hand of Equation 22. The following relations clarify the result:

| $b_{1i}$ | $d_{1i}$ | $b_{2i}$ | $d_{2i}$ | $\frac{1}{2}+b_{2i}-2b_{1i}$ | $-(d_{1i}-\frac{1}{2}d_{2i})$ |
|---|---|---|---|---|---|
| 0 | −1 | 0 | −1 | 1/2 | 1/2 |
| 0 | −1 | 1 | +1 | 3/2 | 3/2 |
| 1 | +1 | 0 | −1 | −3/2 | −3/2 |
| 1 | +1 | 1 | +1 | −1/2 | −1/2 |

The correctness of these results can also be shown by the following relation:

By the definition of the "$b$'s" and "$d$'s":

$$b_{1i}=\tfrac{1}{2}(d_{1i}+1)$$

and $$b_{2i}=\tfrac{1}{2}(d_{2i}+1)$$

Substituting these relations in Equation 27 results in:

$$(\tfrac{1}{2}+b_{2i}-2b_{1i}=\tfrac{1}{2}+\tfrac{1}{2}(d_{2i}+1)-(d_{1i}+1)=-d_{2i}+\tfrac{1}{2}d_{2i}=-(d_{1i}-\tfrac{1}{2}d_{2i})$$

Thus the $$\text{signal at point } F=-S_i'(d_{1i}-\tfrac{1}{2}d_{2i})=-f(i) \quad \text{Eq. 28}$$

where $f(i)$ is defined by Equation 28.

Similarly the $$\text{signal at point } G=-S'_q(d_{1q}-\tfrac{1}{2}d_{2q})=-f(q) \quad \text{Eq. 29}$$

when $f(q)$ is defined by Equation 29.

$$\text{Signal at point } H=-\frac{R}{R}(\text{Signal at point } G)=S'_q(d_{1q}-\tfrac{1}{2}d_{2q})=f(q) \quad \text{Eq. (30)}$$

$$\text{Signal at point } I=-\frac{R}{R}(-f(i))-\frac{R}{R}(f(q))=f(i)-f(q) \quad \text{Eq. 31}$$

$$\text{Signal at point } J=-\frac{R}{R}(f(i)-f(q))=-(f(i)-f(q)) \quad \text{Eq. 32}$$

To formulate the final output $E(\phi)$ at point L, consider the following relations:

| $d_{1i}$ | $d_{1q}$ | $b_{1i}$ | $b_{1q}$ | $d_{1i}d_{1q}$ | $b_{1i}\oplus b_{1q}$ | $\overline{b_{1i}\oplus b_{1q}}$ |
|---|---|---|---|---|---|---|
| −1 | −1 | 0 | 0 | +1 | 0 | 1 |
| −1 | +1 | 0 | 1 | −1 | 1 | 0 |
| +1 | −1 | 1 | 0 | −1 | 1 | 0 |
| +1 | +1 | 1 | 1 | +1 | 0 | 1 |

These relations show that $$b_{1i}\oplus b_{1q}=\tfrac{1}{2}(1-d_{1i}d_{1q})$$

and $$\overline{b_{1i}\oplus b_{1q}}=\tfrac{1}{2}(1+d_{1i}d_{1q})$$

also

| $d_{1i}$ | $d_{1q}$ | $d_{2i}$ | $d_{2q}$ | $d_{1i}\cdot d_{1q}\cdot d_{2i}\cdot d_{2q}$ | $b_{1i}\oplus b_{1q}\oplus b_{2i}\oplus b_{2q}$ |
|---|---|---|---|---|---|
| −1 | −1 | −1 | −1 | +1 | 0 |
| −1 | −1 | −1 | +1 | −1 | 1 |
| −1 | −1 | +1 | −1 | −1 | 1 |
| −1 | −1 | +1 | +1 | +1 | 0 |
| −1 | +1 | −1 | −1 | −1 | 1 |
| −1 | +1 | −1 | +1 | +1 | 1 |
| −1 | +1 | +1 | −1 | +1 | 0 |
| −1 | +1 | +1 | +1 | −1 | 1 |
| +1 | −1 | −1 | −1 | −1 | 1 |
| +1 | −1 | −1 | +1 | +1 | 0 |
| +1 | −1 | +1 | −1 | +1 | 0 |
| +1 | −1 | +1 | +1 | −1 | 1 |
| +1 | +1 | −1 | −1 | +1 | 0 |
| +1 | +1 | −1 | +1 | −1 | 1 |
| +1 | +1 | +1 | −1 | −1 | 1 |
| +1 | +1 | +1 | +1 | +1 | 0 |

These show that $b_{1i}\oplus b_{1q}\oplus b_{2i}\oplus b_{2q}=\tfrac{1}{2}(1-d_{1i}\cdot d_{1q}\cdot d_{2i}\cdot d_{2q})$ From FIG. 4:

$$E(\phi)=\frac{-1}{\frac{3}{2R}+\frac{b_{1i}\oplus b_{1q}\oplus b_{2i}\oplus b_{2q}}{R}}\left[(f(i)-f(q))\frac{b_{1i}\oplus b_{1q}}{R}-(f(i)-f(q))\frac{\overline{b_{1i}\oplus b_{1q}}}{R}\right]$$

by substituting "$d$'s" for "$b$'s":

Signal at point $L=-$ $$\frac{[(f(i)-f(q))1/2(1-d_{1i}d_{1q})-(f(i)-f(q))1/2(1+d_{1i}d_{1q})]}{3/2+1/2(1-d_{1i}\cdot d_{1q}\cdot d_{2i}\cdot d_{2q})}=$$

$$d_{1i}d_{1q}\frac{f(i)-f(q)}{2-1/2d_{1i}\cdot d_{1q}\cdot d_{2i}\cdot d_{2q}} \qquad \text{Eq. 33}$$

From Equation 24

$$\frac{(d_{1i}-1/2d_{2i})s_i'-(d_{1q}-1/2d_{2q})S_q'}{2d_{1i}d_{1q}-1/2d_{2i}d_{2q}}=-(h_{0iq}\cos\phi+h_0\sin\phi)$$

or by multiplying both numerator and denominator by $d_{1i}d_{1q}$ and substituting using the definitions of Equations 28 and 29

$$d_{1i}d_{1iq}\frac{f(i)-f(q)}{2-1/2d_{1i}\cdot d_{1q}\cdot d_{2i}\cdot d_{2q}}=-(h_{0iq}\cos\phi+h_0\sin\phi) \qquad \text{Eq. 34}$$

since $d_i^2\equiv d_q^2\equiv 1$.

By comparing Equations 33 and 34, it is evident that the signal output at point L, namely E($\phi$) of FIG. 4 is the desired error signal.

The implementation of FIG. 4 specifically is shown in a hybrid analog form but it will be obvious to those persons skilled in the art that the analog embodiment shown could be changed to a completely digital version utilizing applicants, teachings. For example, by means of A/D converters, the signals $S_i'$ and $S_q'$ can be converted to digital numbers of any desired precision within the limitations of the state of the art. A single precision A/D converter with signal multiplexer can be used to generate both digital numbers. Once $S_i'$ and $S_q'$ are converted to digital numbers, the necessary operations to produce the desired result become simple digital operations which are easily performed by standard digital components. For example, to obtain the digital number equivalent to $(d_{1i}-\tfrac{1}{2}d_{2i})S_i'$, the necessary operations to be performed on the digital number equivalent to $S_i'$ are as follows:

| $b_{1i}$ | $b_{2i}$ | Required operation to obtain $(d_{1i}-\tfrac{1}{2}d_{2i})S_i'$ |
|---|---|---|
| 0 | 0 | Change the sign of $S_i'$ and divide by 2. |
| 0 | 1 | Change the sign of $S_i'$ and divide by 2 and add to $-S_i$: |
| 1 | 0 | Divide $S_i'$ by 2 and add to $S_i'$. |
| 1 | 1 | Divide $S_i'$ by 2. |

Similarly, the digital equivalents of $(d_{1q}-\tfrac{1}{2}d_{2q})S_q'$ can be obtained in a similar manner. The substraction sign change and gain change required to obtain the digital E($\phi$) can be similarly performed through normal digital means. The digital signal E($\phi$) can be used directly to control a digital voltage controlled oscillator, or the analog signal of E($\phi$) can be used to control the oscillator.

Figure 5:
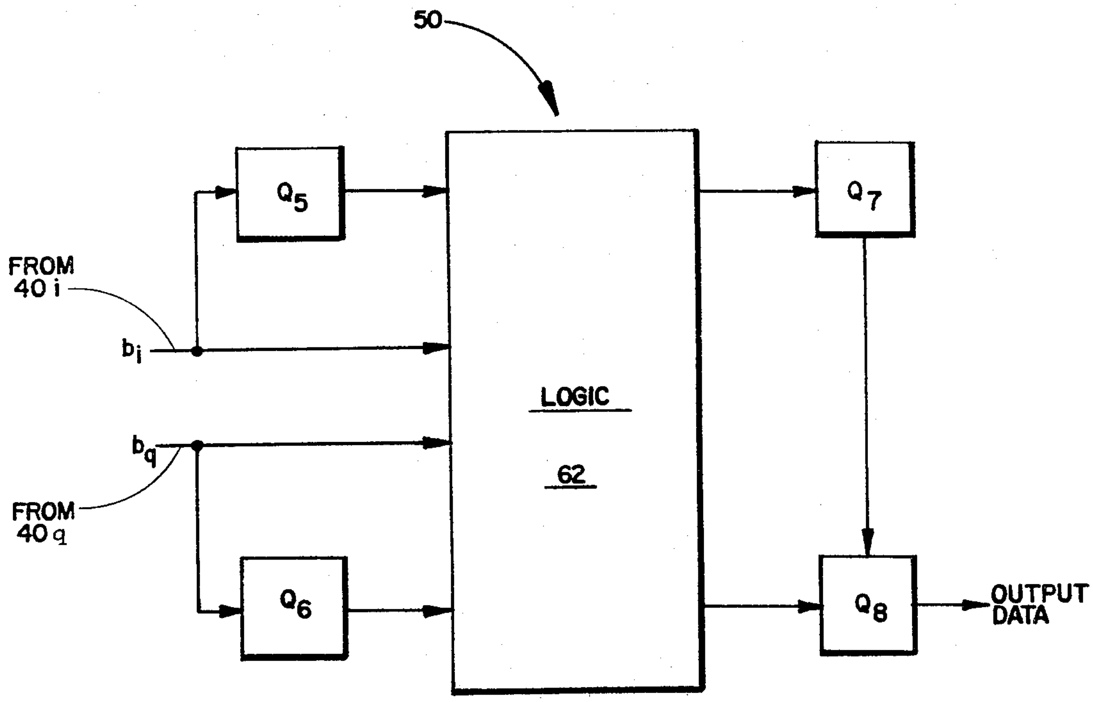
FIG. 5 is a schematic block diagram of a decoder which may be used with the receiver of FIG. 1.

Referring to FIG. 1, the output from each analog to digital converter 40 is fed to a differential decoder 50 which provides the digital output signal $D_{out}$. The decoder 50 is shown in FIG. 5. The input signals $b_{1i}$ and $b_{1q}$ are fed to flip-flops $Q_5$ and $Q_6$, respectively, and to the logic block 62. The outputs from the logic block 62 are fed to flip-flops $Q_7$ and $Q_8$ with the output of $Q_7$ being fed to $Q_8$. The output of $Q_8$ is the digital signal $D_{out}$. Tables A–3 and A–4 set forth the coding logic for logic block 62 and the operating states of flip-flops $Q_5$ through $Q_8$.

TABLE A–3

| $Q^5$ | $Q^6$ | Received phase (degrees) |
|---|---|---|
| 0 | 0 | 0 |
| 0 | 1 | 90 |
| 1 | 0 | 270 |
| 1 | 1 | 180 |

TABLE A–4

Decoding logic

| $b_{1i}$ | $b_{1q}$ | $Q_5$ | $Q_6$ | $Q_7$ | $D_{out}$ ($Q_8$) |
|---|---|---|---|---|---|
| 0 | 0 | 0 | 0 | 0 | 0 |
| 0 | 0 | 0 | 1 | 1 | 0 |
| 0 | 0 | 1 | 0 | 0 | 1 |
| 0 | 0 | 1 | 1 | 1 | 1 |
| 0 | 1 | 0 | 0 | 0 | 1 |
| 0 | 1 | 0 | 1 | 0 | 0 |
| 0 | 1 | 1 | 0 | 1 | 1 |
| 0 | 1 | 1 | 1 | 1 | 0 |
| 1 | 0 | 0 | 0 | 1 | 0 |
| 1 | 0 | 0 | 1 | 1 | 1 |
| 1 | 0 | 1 | 0 | 0 | 0 |
| 1 | 0 | 1 | 1 | 0 | 1 |
| 1 | 1 | 0 | 0 | 1 | 1 |
| 1 | 1 | 0 | 1 | 0 | 1 |
| 1 | 1 | 1 | 0 | 1 | 0 |
| 1 | 1 | 1 | 1 | 0 | 0 |

Figure 6:
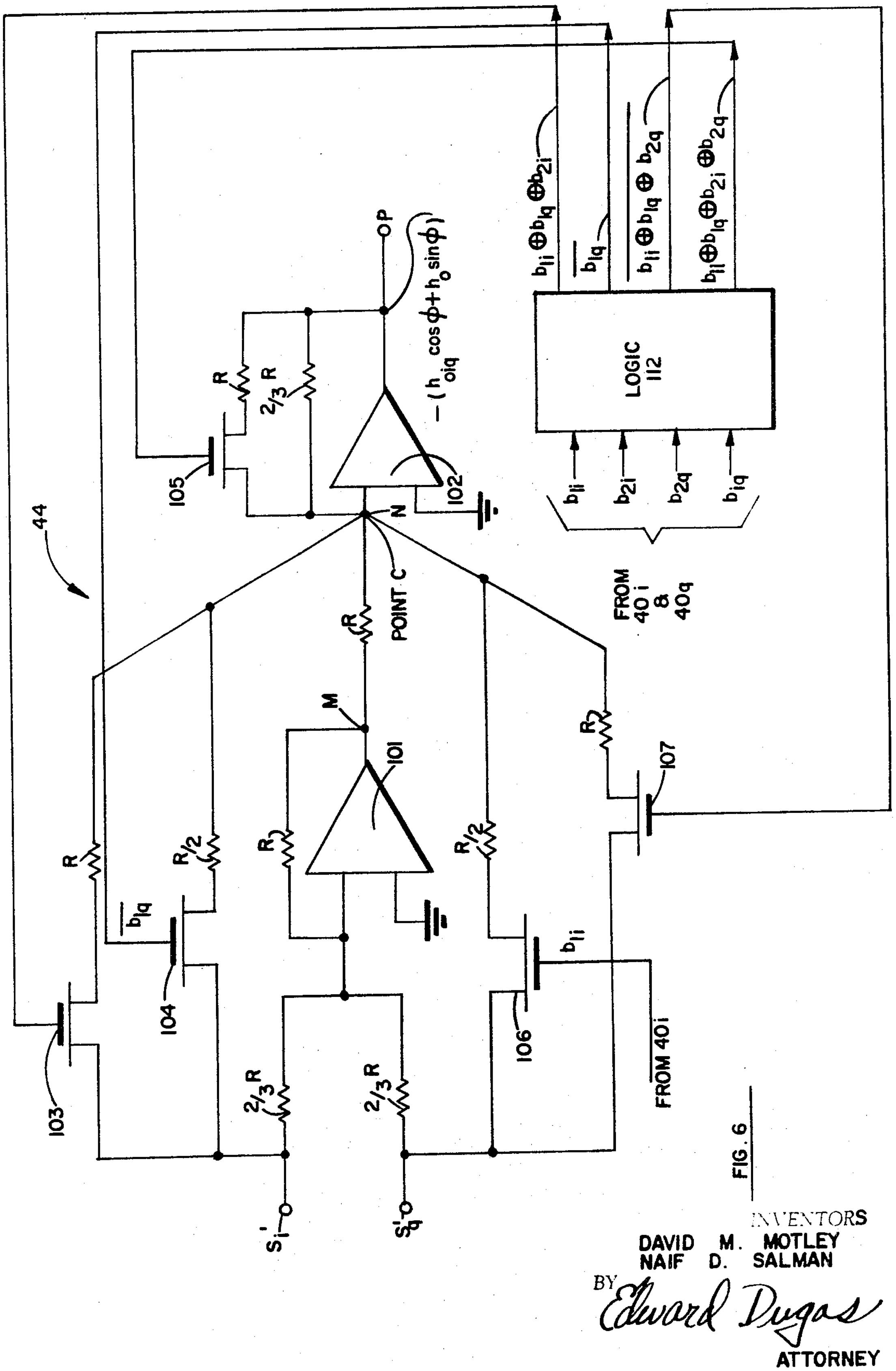
FIG. 6 is a schematic diagram of a third embodiment of a switching and weighting means which can be used with the receiver embodiment of FIG. 1.

Referring now to FIG. 6 wherein a second embodiment of the switching and weighting means 44 having a four-level capability is shown. This particular configuration has the advantage of providing a relatively simple mechanization. The switching and weighting means of FIG. 6 is comprised of two operational amplifiers, 101 and 102, switches or gates, 103 to 107, and a plurality of resistance elements R with appropriate scale factors preceding the R designations. A logic block 112 receives the $b$ signals from the A/D converters $40_i$ and $40_q$ and performs the indicated operations to provide output signals to control the designated switches. The circuit is based on the aforementioned unique conversion technique involving the conversion of the analog data to a digital control signal. The technique is based on the fact that by the definition given for $d$ and $b$ $$d=1-2\bar{b} \qquad \text{Eq. 35}$$

because for $d=1$, $b=1$ and $\bar{b}=0$ and for $d=-1$, $b=0$ and $\bar{b}=1$;

also $-d=1-2b$ Eq. 36

Both Equations 35 and 36 have the same foremat, namely a constant minus, another constant multiplied by a digital bit which is either 0 or 1. The mechanization of Equations 35 or 36 is, therefore, simple and equivalent. For example, the function $$f(i)=(d_{1i}-\tfrac{1}{2}d_{2i})S_i' \qquad \text{Eq. 37}$$

can be rewritten as $$f(i)=(1-2\bar{b}_{1i})S_i'+\tfrac{1}{2}(1-2b_{2i})S_i'$$
$$=3/2S_i'-2\bar{b}_{1i}S_i'-b_{2i}S_i' \qquad \text{Eq. 38}$$

The output at point M in FIG. 6 is given by:

$$\text{Point } M=-3/2(S_i'+S_q') \qquad \text{Eq. 39}$$

Letting the value of the resistance between points N and P be R$f(b)$ which can have one of two values, ⅔R or ⅖R, which is the parallel combination of ⅔R and R. The output at P will be:

$$\text{Point } P=3/2f(b)(S_i'+S_q')-f(b)(2\bar{b}_{1q}+(b_{1i}\oplus b_{1q}\oplus b_{2i}))S_i'-f(b)(2b_{1i}+\overline{b_{1i}\oplus b_{1q}\oplus b_{2q}})S_q' \quad \text{(Eq. 40)}$$

or $$P=f(b)[(1-2\bar{b}_{1q}+1/2-b_{1i}\oplus b_{1q}\oplus b_{2i})S_i'+(1-2b_{1i}+1/2-\overline{b_{1i}\oplus b_{1q}\oplus b_{2q}})S_q'] \quad \text{(Eq. 41)}$$

which from Equations 35 and 36 can be written as $$P=f(b)[(d_{1q}-1/2d_{1i}.d_{1q}.d_{2i})S_i'+(-d_{1i}+1/2d_{1i}.d_{1q}.d_{2q})S_q']$$
$$=f(b)d_{1i}d_{1q}[(d_{1i}-1/2d_{2i})S_i'-(d_{1q}-1/2d_{2q})S'_q] \quad \text{(Eq. 42)}$$

In Equation 42, $f(b)$ is given by $$f(b)=⅔$$

for $$b_{1i}\oplus b_{1q}\oplus b_{2i}\oplus b_{2q}=0$$

which is equivalent to $$d_{1i}.d_{1q}.d_{2i}.d_{2q}=+1 \quad \text{(See Equation 25)}$$

$$f(b)=\frac{2/3+1}{2/3+1}=2/5$$

for $$b_{1i}\oplus b_{1q}\oplus b_{2i}\oplus b_{2q}=1$$

which is equivalent to $$d_{1i}.d_{1q}.d_{2i}.d_{2q}=-1 \quad \text{(See Equation 26)}$$

This shows Equation 42 to be equivalent to Equation 34 and that the output P is the required error signal, namely $$P=-(h_{0iq}\cos\phi+h_0\sin\phi) \quad \text{Eq. 43}$$

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

We claim:

1. For use in an asymmetrical suppressed carrier, quadrature transmission system wherein the received signals in an in-phase channel and a quadrature channel are equalized to subtantially eliminate the components of all previously received data signal values, the equalized received signals having cross coupled terms being thereafter converted to respective in-phase and quadrature data signal values, a method of generating an error signal proportional to the phase difference between the suppressed transmitting carrier of the system and the output of a local reference carrier generator of the system, said method being for machine implementation and comprising the steps of:

multiplying the equalized received signal in said in-phase channel by the quadrature data signal value to form a first product;

multiplying the equalized received signal in said quadrature channel by the in-phase data signal value to form a second product;

subtracting said first and second products to form a difference signal; and forming the square of the value of said quadrature data signal and the square of the value of the said in-phase data signal; dividing said difference signal by the sum of the squares of said quadrature and in-phase data signals whereby the quotient forms said error signal.

2. The method defined in claim 1, and further including the steps of:

applying said error signal to the local reference carrier generator to drive the phase difference between the suppressed transmitting carrier and the locally generated reference carrier so as to drive said error signal substantially to zero.

3. In a quadrature transmission system having first and second phase sensitive demodulators for producing outputs $S_i'$ and $S_q'$, respectively, from an input signal having the form $$R(t)=X_i\cos\omega_c t+X_q\sin\omega_c t$$

where $X_i$ and $X_q$ are the general in-phase and quadrature impulse response characteristics, respectively, and where $\cos\omega_c t$ and $\sin\omega_c t$ are the in-phase and quadrature carriers, respectively, and wherein simplified forms of $X_i$ and $X_q$ can be expressed as:

$$X_i=d(n)_i h_{0i}+d(n)_{i-1}h_{1i}+d(n)_q h_{0qi}+d(n)_{q-1}h_{1qi}+\ldots$$

$$X_q=d(n)_q h_{0q}+d(n)_{q-1}h_{1q}+d(n)_i h_{0iq}+d(n)_{i-1}h_{1iq}+\ldots$$

where $d(n)_i$ and $d(n)_q$ are data bits associated with said produced outputs and $h_{0i}$, $h_{0q}$, $h_{0qi}$ and $h_{0iq}$ are the major sample values of the in-phase, quadrature, quadrature to in-phase and in-phase to quadrature impulse values, respectively;

after demodulation and the elimination of the demodulation sum products, the outputs of the in-phase and quadrature channels become with proper substitution $$S_i'=d(n)_i(h_0\cos\phi-h_{0iq}\sin\phi)+d(n)_q(-h_{0iq}\cos\phi-h_0\sin\phi)$$

$$S_q'=d(n)_q(h_0\cos\phi-h_{0iq}\sin\phi)+d(n)_i(h_{0iq}\cos\phi+h_0\sin\phi)$$

where $-(h_{0iq}\cos\phi+h_0\sin\phi)$ is the error term between outputs $S_i'$ and $S_q'$, apparatus for controlling the reference phase to drive said error term towards zero, comprising, in combination:

(a) a first and second low pass filter means receiving the input from the first and second phase sensitive demodulators, respectively, for removing all frequency components above $2\omega_c$;

(b) a first and second sample and hold means connected to receive the output from said first and second phase sensitive demodulators, respectively, said sample and hold means sampling the output signals from said demodulators at periodic times and retaining said signals until the next sample time;

(c) a first and second analog to digital converter for receiving said $S_i'$ and $S_q'$ signal, respectively, and for providing digital outputs $d_i$ and $d_q$ proportional to $S_i'$ and $S_q'$, respectively;

(d) means for forming the products $S_i'd_q$ and $S_q'd_i$ and for subtracting $S_q'd_i$ from $S_i'd_q$ to provide an output error signal $-2(h_{0iq}\cos\phi+h_0\sin\phi)$; and (e) variable oscillator means responsive to said error signal providing a first and second phase reference signal to said first and said second phase sensitive demodulators, respectively, so as to drive the phase error signal $-2(h_{01q}\cos\phi+h_0\sin\phi)$ towards zero.

4. The invention according to claim 3 wherein said means for forming the products $S_i'd_q$ and $S_q'd_i$ are comprised of (a) an operational amplifier having a positive and a negative terminal;

(b) a first resistor connecting the signal $S_i'$ to the negative terminal of said amplifier;

(c) a second resistor connecting the signal $S_q'$ to the positive terminal of said amplifier;

(d) a switch connecting the signal $S_q'$ to the negative terminal of said amplifier in response to the signal $d_i$, forming the desired product signal at the output of said amplifier.

References Cited

UNITED STATES PATENTS

| | | | |
|---|---|---|---|
| 3,384,824 | 5/1968 | Grenier | 179—15 BC |
| 3,522,537 | 8/1970 | Boughtwood | 325—50 X |

BENEDICT V. SAFOUREK, Primary Examiner

U.S. Cl. X.R.

325—60, 321